United States Patent
Alberg et al.

(10) Patent No.: US 6,942,894 B2
(45) Date of Patent: Sep. 13, 2005

(54) METHODS FOR PRODUCING COMPOSITE WEBS WITH REINFORCING DISCRETE POLYMERIC REGIONS

(75) Inventors: Randall L. Alberg, Maplewood, MN (US); Bradley W. Eaton, Woodbury, MN (US); Leigh E. Wood, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 10/012,900

(22) Filed: Nov. 5, 2001

(65) Prior Publication Data

US 2003/0084996 A1 May 8, 2003

(51) Int. Cl.[7] .................................................. B05D 5/10
(52) U.S. Cl. ............. 427/256; 427/428.01; 427/428.06; 427/208.2; 156/291; 156/324
(58) Field of Search .................... 156/324, 290–291, 156/310, 553, 582, 583.1; 427/428.01, 428.06, 256, 428, 208.2, 208.1; 118/211, 212, 244, 248, 249, 258; 442/76, 102, 104, 103, 149, 150, 172, 118, 173, 174, 164–171, 176–177; 604/366, 385.31, 370; 492/30, 33, 35, 36; 428/195.1, 198, 200, 201; 101/153, 155, 156, 157, 170, 178, 174, 175, 216, 219, 328, 375, 211, 483; 2/272

(56) References Cited

U.S. PATENT DOCUMENTS

| | | | |
|---|---|---|---|
| 2,170,560 A | | 8/1939 | Hayes |
| 2,787,244 A | | 4/1957 | Hicken |
| 3,276,944 A | | 10/1966 | Levy |
| 3,338,992 A | | 8/1967 | Kinney |
| 3,341,394 A | | 9/1967 | Kinney |
| 3,484,330 A | * | 12/1969 | Sokolowski et al. ........ 428/113 |
| 3,502,538 A | | 3/1970 | Peterson |
| 3,502,763 A | | 3/1970 | Hartman |
| 3,542,615 A | | 11/1970 | Dobo et al. |
| 3,692,618 A | | 9/1972 | Dorschner et al. |
| 3,694,867 A | | 10/1972 | Stumpf |
| 3,814,052 A | | 6/1974 | Caratsch |
| 4,223,059 A | | 9/1980 | Schwarz |
| 4,340,563 A | | 7/1982 | Appel et al. |
| 4,342,613 A | * | 8/1982 | O'Leary et al. ............ 156/310 |

(Continued)

FOREIGN PATENT DOCUMENTS

| | | |
|---|---|---|
| EP | 0 189 351 A2 | 7/1986 |
| EP | 0 189 351 B1 | 3/1991 |
| FR | 1117251 | 12/1954 |
| FR | 2184741 | 12/1973 |
| TW | 355678 | 1/1998 |

(Continued)

OTHER PUBLICATIONS

Encyclopedia of Chemical Technology, vol. 6 (1979), Wiley–Interscience Publication, Third Edition, pp 388–389.
U.S. Appl. No. 60/337,804, Desai et al., filed Nov. 5, 2001.
U.S. Appl. No. 60/338,761, Molander et al., filed Nov. 5, 2001.
U.S. Appl. No. 10/012,698, Eaton et al., filed Nov. 5, 2001.
U.S. Appl. No. 10/012,894, Seidel et al., filed Nov. 5, 2001.
U.S. Appl. No. 10/013,304, Jackson et al., filed Nov. 6, 2001.

*Primary Examiner*—Jessica Rossi
(74) *Attorney, Agent, or Firm*—William J. Bond

(57) ABSTRACT

Methods of manufacturing composite webs including a substrate with one or more reinforcing discrete polymeric regions located on or within the composite web are disclosed. Molten nonelastomeric thermoplastic material of the discrete polymeric region is forced against the substrate by a transfer roll. If the substrate is porous, fibrous, etc., a portion of the nonelastomeric thermoplastic composition may infiltrate the substrate and/or encapsulate fibers of the substrate.

32 Claims, 8 Drawing Sheets

U.S. PATENT DOCUMENTS

| | | |
|---|---|---|
| 4,343,260 A | 8/1982 | Yajima et al. |
| 4,643,130 A | 2/1987 | Sheath et al. |
| 4,732,800 A | 3/1988 | Groshens |
| 4,906,492 A | 3/1990 | Groshens |
| 4,965,122 A | 10/1990 | Morman |
| 4,981,747 A | 1/1991 | Morman |
| 4,984,339 A | 1/1991 | Provost et al. |
| 5,019,071 A | 5/1991 | Bany et al. |
| 5,028,646 A | 7/1991 | Miller et al. |
| 5,077,870 A | 1/1992 | Melbye et al. |
| 5,114,781 A | 5/1992 | Morman |
| 5,116,563 A | 5/1992 | Thomas et al. |
| 5,116,662 A | 5/1992 | Morman |
| 5,167,897 A | 12/1992 | Weber |
| 5,226,992 A | 7/1993 | Morman |
| 5,230,851 A | 7/1993 | Thomas |
| 5,260,015 A | 11/1993 | Kennedy et al. |
| 5,300,057 A | 4/1994 | Miller et al. |
| 5,326,415 A | 7/1994 | Thomas et al. |
| 5,385,706 A | 1/1995 | Thomas |
| 5,389,438 A | 2/1995 | Miller et al. |
| 5,399,219 A | 3/1995 | Roessler et al. |
| 5,441,687 A | 8/1995 | Murasaki et al. |
| 5,454,801 A | 10/1995 | Lauritzen |
| 5,458,590 A * | 10/1995 | Schleinz et al. ............. 604/361 |
| 5,470,424 A | 11/1995 | Isaac et al. |
| 5,490,457 A * | 2/1996 | Boulanger et al. .......... 101/170 |
| 5,501,679 A | 3/1996 | Krueger et al. |
| 5,503,076 A * | 4/1996 | Yeo ............................ 101/483 |
| 5,578,344 A | 11/1996 | Ahr et al. |
| 5,679,302 A | 10/1997 | Miller et al. |
| 5,685,758 A | 11/1997 | Paul et al. |
| 5,685,873 A | 11/1997 | Bruemmer |
| 5,705,013 A | 1/1998 | Nease et al. |
| 5,755,015 A | 5/1998 | Akeno et al. |
| 5,792,411 A | 8/1998 | Morris et al. |
| 5,827,579 A | 10/1998 | Groshens |
| 5,843,057 A * | 12/1998 | McCormack ............... 604/367 |
| 5,868,987 A | 2/1999 | Kampfer et al. |
| 5,916,207 A | 6/1999 | Toyoda et al. |
| 5,948,707 A | 9/1999 | Crawley |
| 6,039,911 A | 3/2000 | Miller et al. |
| 6,054,091 A | 4/2000 | Miller et al. |
| 6,093,665 A | 7/2000 | Sayovitz et al. |
| 6,132,411 A | 10/2000 | Huber et al. |
| 6,132,660 A | 10/2000 | Kampfer |
| 6,190,594 B1 | 2/2001 | Gorman et al. |
| 6,255,236 B1 | 7/2001 | Cree et al. |
| 6,261,278 B1 | 7/2001 | Chen et al. |
| 6,287,665 B1 | 9/2001 | Hammer |
| 6,638,605 B1 * | 10/2003 | Ankuda et al. ............. 428/198 |
| 2002/0115972 A1 * | 8/2002 | Dabi et al. |
| 2003/0085485 A1 * | 5/2003 | Seidel et al. |
| 2003/0087059 A1 * | 5/2003 | Jackson et al. |
| 2003/0088220 A1 | 5/2003 | Molander et al. |
| 2003/0088228 A1 | 5/2003 | Desai et al. |
| 2003/0091807 A1 | 5/2003 | Desai et al. |
| 2003/0111166 A1 | 6/2003 | Uitenbroek et al. |

FOREIGN PATENT DOCUMENTS

| | | | |
|---|---|---|---|
| WO | WO 96/10481 A1 | 4/1996 | |
| WO | WO-00-07532 * | 2/2000 | ........... A61F/13/15 |
| WO | WO 00/20200 A1 | 4/2000 | |
| WO | WO 00/50229 A1 | 8/2000 | |
| WO | WO 01/68019 A1 | 9/2001 | |
| WO | WO 01/71080 A1 | 9/2001 | |

* cited by examiner

METHODS FOR PRODUCING COMPOSITE WEBS WITH REINFORCING DISCRETE POLYMERIC REGIONS

FIELD OF THE INVENTION

The present invention relates to methods of manufacturing composite webs that include reinforcing discrete polymeric regions.

BACKGROUND

The manufacture of articles formed of webs that require some reinforcement to withstand forces experienced during use are known. In many cases, reinforcement is simply provided over the entire substrate or web. Such approaches can, however, add cost and weight to the web, as well as stiffness over the entire surface of the web—even in those areas that do not require reinforcement. Furthermore, reinforcing layers that are coextensive with the web may also reduce its breathability.

To address some of these issues, smaller pieces of reinforcing materials may be attached to a web or substrate in selected areas that require reinforcement. The handling and attachment of such discrete pieces can, however, be problematic, by potentially reducing throughput, causing waste (where the discrete pieces are not securely attached), requiring precise registration or location on the web, requiring the use of adhesives or other bonding agents, etc. The discrete pieces may also present relatively sharp that may be the source of irritation or discomfort. The irritation or discomfort can be exacerbated because the reinforcing pieces are typically located on the surface of the substrate.

SUMMARY OF THE INVENTION

The present invention provides methods of manufacturing composite webs including a substrate with one or more reinforcing discrete polymeric regions located on or within the composite web.

One advantage of the methods of the present invention is the ability to transfer one or more discrete polymeric regions onto a major surface of a substrate, where the thermoplastic material of the discrete polymeric region can be forced against the substrate by a transfer roll. If the substrate is porous, fibrous, etc., pressure may enhance attachment of the discrete polymeric regions to the substrates by forcing a portion of the thermoplastic composition to infiltrate the substrate and/or encapsulate fibers of the substrate.

Another advantage is the ability to control the shape, spacing, and volume of the discrete polymeric regions. This may be particularly advantageous because these parameters (shape, spacing, and volume) can be fixed regardless of the line speed of the system.

Another advantage of the present invention may be found in the composite depressions and their use, which may improve the formation of reinforcing discrete polymeric regions in accordance with the present invention. The composite depressions may, e.g., improve the transfer of relatively large discrete polymeric regions onto the substrates as well as the transfer of discrete polymeric regions that have a varying thickness.

Another advantage of the methods of the present invention is the ability to provide one or more discrete polymeric regions that extend for the length of the substrate (while not being formed over the width of the substrate, i.e., the discrete polymeric regions are not coextensive with the major surface of the substrate).

Another advantage of the methods of the present invention is the ability to provide different thermoplastic compositions across the width of the substrate, such that some discrete polymeric regions may be formed of one thermoplastic composition, while other discrete polymeric regions are formed of a different thermoplastic composition.

Yet another advantage of the methods of the present invention is the ability to provide one or more discrete polymeric regions on both major surfaces of a substrate. The discrete polymeric regions on the opposing major surfaces may be formed with the same or different features as desired.

In one aspect, the present invention provides a method for producing a composite web, the method including providing a transfer roll having an exterior surface that includes one or more depressions formed therein, wherein the one or more depressions include at least one depression that includes a composite depression formed by a plurality of cells; and delivering a molten nonelastomeric thermoplastic composition onto the exterior surface of the transfer roll. The method further includes wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll; and transferring at least a portion of the molten nonelastomeric thermoplastic composition in the one or more depressions to a first major surface of a substrate by contacting the first major surface of the substrate to the exterior surface of the transfer roll and the molten nonelastomeric thermoplastic composition in the one or more depressions, followed by separating the substrate from the transfer roll, wherein one or more discrete polymeric regions formed of the nonelastomeric thermoplastic composition are located on the first major surface of the substrate after separating the substrate from the transfer roll.

In another aspect, the present invention provides a method for producing a composite web, the method including providing a transfer roll with an exterior surface that includes one or more depressions formed therein, wherein the one or more depressions include at least one depression that includes a composite depression formed by a plurality of overlapping cells; and delivering a molten nonelastomeric thermoplastic composition onto the exterior surface of the transfer roll. The method also includes wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll; and forcing a portion of a first major surface of a substrate into the one or more depressions, wherein the first major surface includes a porous surface including fibers, and wherein a portion of the nonelastomeric thermoplastic composition in the one or more depressions infiltrates the porous surface, and still further wherein the molten nonelastomeric thermoplastic composition encapsulates at least a portion of at least some of the fibers. The method further includes separating the substrate from the transfer roll, wherein one or more discrete polymeric regions formed of the nonelastomeric thermoplastic composition are located on the first major surface of the substrate after separating the substrate from the transfer roll.

In another aspect, the present invention provides a method for producing a composite web, the method including providing a transfer roll with an exterior surface that has one or more depressions formed therein; and delivering a molten nonelastomeric thermoplastic composition onto the exterior surface of the transfer roll. The method further includes wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll; and transferring at least a portion of the molten nonelastomeric thermoplastic composition in the one or more depressions to a first major surface of a first substrate by contacting the first major surface of the first substrate to the exterior surface of the transfer roll and the molten nonelastomeric thermoplastic composition in the one or more depressions, followed by separating the first substrate from the transfer roll, wherein one or more discrete polymeric regions formed of the nonelastomeric thermoplastic composition are located on the first major surface of the first substrate after separating the first substrate from the transfer roll. The method also includes laminating a second substrate to the first major surface of the first substrate, wherein the one or more discrete polymeric regions on the first substrate are located between the first substrate and the second substrate after laminating the second substrate to the first substrate.

In another aspect, the present invention provides a method for producing a composite web, the method including providing a transfer roll with an exterior surface that has one or more depressions formed therein; and delivering a molten nonelastomeric thermoplastic composition onto the exterior surface of the transfer roll. The method includes wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll. The method also includes transferring at least a portion of the molten nonelastomeric thermoplastic composition in the one or more depressions to a first major surface of a first substrate by contacting the first major surface of the first substrate to the exterior surface of the transfer roll and the molten nonelastomeric thermoplastic composition in the one or more depressions, followed by separating the first substrate from the transfer roll, wherein one or more discrete polymeric regions formed of the nonelastomeric thermoplastic composition are located on the first major surface of the first substrate after separating the first substrate from the transfer roll. The method further includes laminating a second substrate to a second major surface of the first substrate, wherein the second major surface of the first substrate is located on the opposite side of the first substrate from the first major surface of the first substrate, wherein the one or more discrete polymeric regions on the first substrate are exposed on the first substrate.

In another aspect, the present invention provides a transfer roll device for transferring molten thermoplastic compositions to a substrate, the device including a roll with an exterior surface; and one or more depressions formed in the exterior surface of the roll, wherein each depression of the one or more depressions is a composite depression formed by a plurality of cells.

These and other features and advantages of methods according to the present invention are described below in connection with various illustrative embodiments of the invention.

DETAILED DESCRIPTION OF ILLUSTRATIVE EMBODIMENTS OF THE INVENTION

As discussed above, the present invention provides methods and systems for producing composite webs that include a substrate with reinforcing discrete polymeric regions located on the surface or within the composite web. Various different constructions will now be described to illustrate various embodiments of the composite webs that can be manufactured in accordance with the methods of the present invention. These illustrative constructions should not be considered to limit the methods of the present invention, which is to be limited only by the claims that follow.

Figure 1:
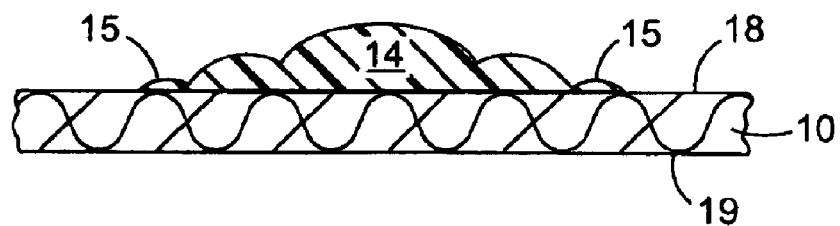
FIG. 1 is a cross-sectional view of one reinforcing discrete polymeric region on a composite web manufactured according to the methods of the present invention.

FIG. 1 is a cross-sectional view of a portion of one composite web manufactured in accordance with the present invention. The composite web includes a substrate 10 with a first major surface 18 and a second major surface 19. One or more reinforcing discrete polymeric regions 14 are located on the first major surface 18 of the substrate 10, it being understood that the substrate may include more than one reinforcing discrete polymeric region as depicted in, e.g., FIGS. 7–12.

It may be preferred that the reinforcing discrete polymeric regions 14 of composite webs manufactured in accordance with the present invention each include a varying thickness or height above the surface 18 of the substrate 10. It may be particularly preferred that the thickness variations be provided in the form of a thinner discrete polymeric region proximate the edges 15 of the reinforcing discrete polymeric region 14.

The combination of thicker central portions of the reinforcing discrete polymeric region 14 and thinner edges 15 may provide advantages. The thinner edges 15 may be more flexible or softer, which may enhance comfort if the composite web including such discrete polymeric regions is incorporated into a garment such as, e.g., a diaper, surgical gown, etc. At the same time, the thicker central portion of the reinforcing discrete polymeric region 14 may provide a desired level of rigidity to the discrete polymeric region.

The reinforcing discrete polymeric regions 14 may cover any desired portion of the surface 18 of the substrate 10 on which they are positioned, although it will be understood that the discrete polymeric regions 14 will not cover all of the surface of the substrate 10. Some variations in the percentage of surface area occupied by discrete polymeric regions may be as described in, for example, pending U.S. patent application Ser. No. 09/257,447, entitled WEB HAVING DISCRETE STEM REGIONS, filed on Feb. 25, 1999 (published as International Publication No. WO 00/50229).

Further, although the discrete polymeric regions 14 are depicted as being disconnected from each other, it should be understood that some composite webs manufactured with the systems and methods of the present invention may include a relatively thin skin layer of the thermoplastic composition used to form the discrete polymeric regions. Such a skin layer may, in some instances, connect some or all of the discrete polymeric regions on the composite web. In any event, however, the amount of polymeric material in the skin layer will be insufficient to provide significant reinforcement of the substrate outside of the thicker discrete polymeric regions.

The substrates used in connection with the composite webs of the present invention may have a variety of constructions. For example, the substrates may be a woven material, nonwoven material, knit material, paper, film, or any other continuous media that can be fed through a nip point. The substrates may have a wide variety of properties, such as extensibility, elasticity, flexibility, conformability, breathability, porosity, stiffness, etc. Further, the substrates may include pleats, corrugations or other deformations from a flat planar sheet configuration.

In some instances, the substrates may exhibit some level of extensibility and also, in some instances, elasticity. Extensible webs that may be preferred may have an initial yield tensile force of at least about 50 gm/cm, preferably at least about 100 gm/cm. Further, the extensible webs may preferably be extensible nonwoven webs.

Suitable processes for making a nonwoven web that may be used in connection with the present invention include, but are not limited to, airlaying, spunbond, spunlace, bonded melt blown webs and bonded carded web formation processes. Spunbond nonwoven webs are made by extruding a molten thermoplastic, as filaments from a series of fine die orifices in a spinneret. The diameter of the extruded filaments is rapidly reduced under tension by, for example, by non-eductive or eductive fluid-drawing or other known spunbond mechanisms, such as described in U.S. Pat. No. 4,340,563 (Appel et al.); U.S. Pat. No. 3,692,618 (Dorschner et al.); U.S. Pat. Nos. 3,338,992 and 3,341,394 (Kinney); U.S. Pat. No. 3,276,944 (Levy); U.S. Pat. No. 3,502,538 (Peterson); U.S. Pat. No. 3,502,763 (Hartman) and U.S. Pat. No. 3,542,615 (Dobo et al.). The spunbond web is preferably bonded (point or continuous bonding).

The nonwoven web layer may also be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation.

Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between about 6 to about 19 millimeters are separated and entrained in an air supply and then deposited onto a forming screen, often with the assistance of a vacuum supply. The randomly deposited fibers are then bonded to one another using, for example, hot air or a spray adhesive.

Meltblown nonwoven webs may be formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, meltblown webs must be further bonded such as by through air bonding, heat or ultrasonic bonding as described above.

A web can be made extensible by skip slitting as is disclosed in, e.g., International Publication No. WO 96/10481 (Abuto et al.). If an elastic, extensible web is desired, the slits are discontinuous and are generally cut on the web prior to the web being attached to any elastic component. Although more difficult, it is also possible to create slits in the nonelastic web layer after the nonelastic web is laminated to the elastic web. At least a portion of the slits in the nonelastic web should be generally perpendicular (or have a substantial perpendicular vector) to the intended direction of extensibility or elasticity (the at least first direction) of the elastic web layer. By generally perpendicular it is meant that the angle between the longitudinal axis of the chosen slit or slits and the direction of extensibility is between 60 and 120 degrees. A sufficient number of the described slits are generally perpendicular such that the overall laminate is elastic. The provision of slits in two directions is advantageous when the elastic laminate is intended to be elastic in at least two different directions.

A nonwoven web used in connection with the present invention can also be a necked or reversibly necked nonwoven web as described in U.S. Pat. Nos. 4,965,122; 4,981,747; 5,114,781; 5,116,662; and 5,226,992 (all to Morman). In these embodiments the nonwoven web is elongated in a direction perpendicular to the desired direction of extensibility. When the nonwoven web is set in this elongated condition, it will have stretch and recovery properties in the direction of extensibility.

The substrates used in connection with the present invention may preferably exhibit some porosity on one or both of the major surfaces of the substrate such that when a molten thermoplastic composition is provided on one of the major surfaces of the substrate, a mechanical bond is formed between the molten thermoplastic composition and the substrate as the molten thermoplastic composition infiltrates and/or encapsulates a portion of the porous surface of the substrate. As used in connection with the present invention, the term "porous" includes both structures that include voids formed therein, as well as structures formed of a collection of fibers (e.g., woven, nonwoven, knit, etc.) that allow for the infiltration of molten thermoplastic composition into the interstices between fibers. If the porous surface includes fibers, the thermoplastic composition may preferably encapsulate fibers or portions of fibers on the surface of the substrate.

The type and construction of the material or materials in the substrate should be considered when selecting an appropriate substrate to which a molten thermoplastic composition is applied. Generally, such materials are of the type and construction that do not melt, soften, or otherwise disintegrate under the temperatures and pressures experienced during the step of transferring the thermoplastic composition to the substrate. For example, the substrate should have sufficient internal strength such that it does not fall apart during the process. Preferably, the substrate has sufficient strength in the machine direction at the temperature of the transfer roll to remove it intact from the transfer roll.

As used herein, the term "fiber" includes fibers of indefinite length (e.g., filaments) and fibers of discrete length, e.g., staple fibers. The fibers used in connection with the present invention may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers from the same polymer class (e.g., nylon) but which differ in their properties or characteristics. The term "multicomponent fiber" is thus intended to include, but is not limited to, concentric and eccentric sheath-core fiber structures, symmetric and asymmetric side-by-side fiber structures, island-in-sea fiber structures, pie wedge fiber structures, and hollow fibers of these configurations.

Although the substrates depicted in the various cross-sectional views of the articles manufactured according to the methods of the present invention are illustrated as single layer structures, it should be understood that the substrates may be of single or multi-layer construction. If a multi-layer construction is used, it will be understood that the various layers may have the same or different properties, constructions, etc. Some of these variations may be as described in, for example, pending U.S. patent application Ser. No. 09/257,447, entitled WEB HAVING DISCRETE STEM REGIONS, filed on Feb. 25, 1999 (published as International Publication No. WO 00/50229).

The discrete polymeric regions 14 may be formed of a wide variety of different nonelastomeric thermoplastic polymeric materials. As used in connection with the present invention, "thermoplastic" (and variations thereof) means a polymer or polymeric composition that softens when exposed to heat and returns to its original condition or near its original condition when cooled to room temperature. The thermoplastic compositions used in connection with the methods of the present invention should be capable of flowing or entering into depressions formed in a polymer transfer roll as will be described below.

Suitable thermoplastic compositions are those that are melt processable. Such polymers are those that will flow sufficiently to at least partially fill the depressions, yet not significantly degrade during a melt process. A wide variety of thermoplastic compositions have suitable melt and flow characteristics for use in the process of the present invention depending on the geometry of the depressions and the processing conditions. It may further be preferred that the melt processable materials and conditions of processing are selected such that any viscoelastic recovery properties of the thermoplastic compositions do not cause them to significantly withdraw from the wall(s) of the depressions until transfer of the thermoplastic composition to a substrate is desired.

Some examples of nonelastomeric thermoplastic compositions that may be used in connection with the present invention include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluorocarbons, etc.

A nonelastomeric thermoplastic polymer is one that melts and returns to its original condition or near its original condition upon cooling and which does not exhibit elastomeric properties at ambient conditions (e.g., room temperature and pressure). As used in connection with the present invention, "nonelastomeric" means that the material will not substantially resume its original shape after being stretched. Further, the nonelastomeric materials may preferably sustain permanent set following deformation and relaxation, which set is preferably at least about 20 percent or more, and more preferably at least about 30 percent or more of the original length at moderate elongation, e.g., about 50% (for those materials that can even be stretched up to 50% without fracture or other failure).

The nonelastomeric thermoplastic compositions used in connection with the present invention can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

Figure 2:
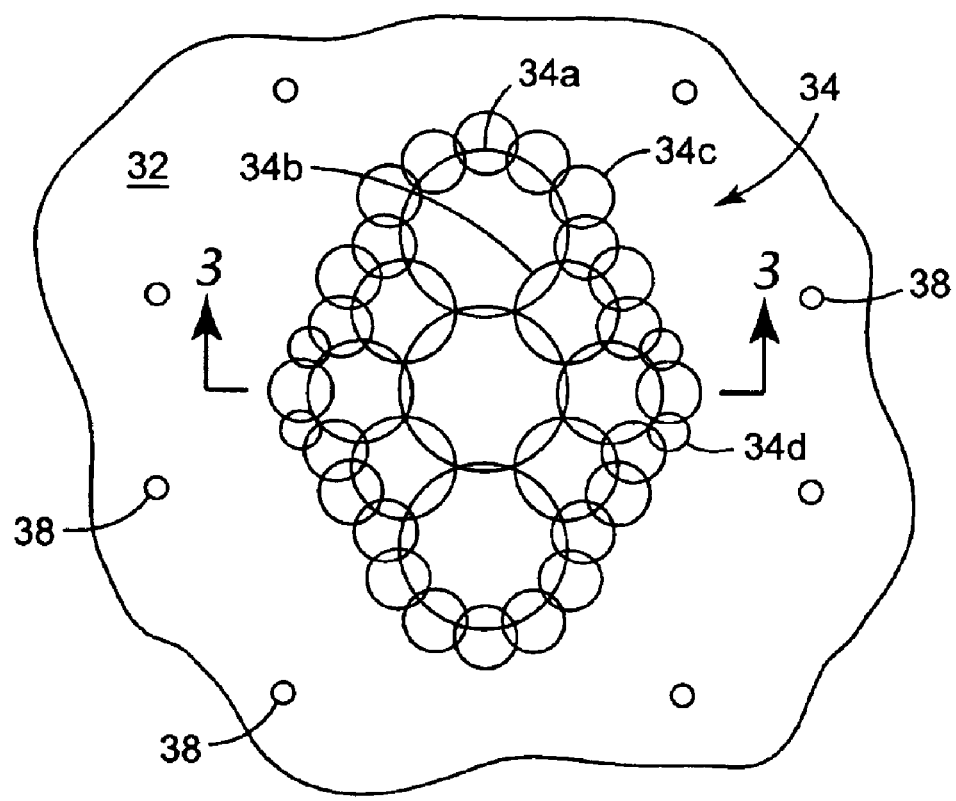
FIG. 2 is a plan view of a portion of a transfer roll that can be used in manufacturing composite webs according to the methods of the present invention.

FIG. 2 is a plan view of a portion of the exterior surface of one transfer tool that can be used to deposit the reinforcing discrete polymeric region 14 on the substrate 10 depicted in FIG. 1. That depicted portion of the exterior surface 32 includes a depression 34 formed therein. FIG. 2 also depicts a number of smaller depressions 38 dispersed over the surface 32 of the transfer roll. Each of the depressions 38 is smaller than the larger depression 34, both in terms of footprint (see below) as well as depression volume. The smaller depressions 38 may also fill with molten thermoplastic composition during use of the transfer roll, with the smaller discrete polymeric regions formed by the depressions 38 serving a variety of purposes as discussed in connection with FIGS. 7–9 below.

Figure 3A:
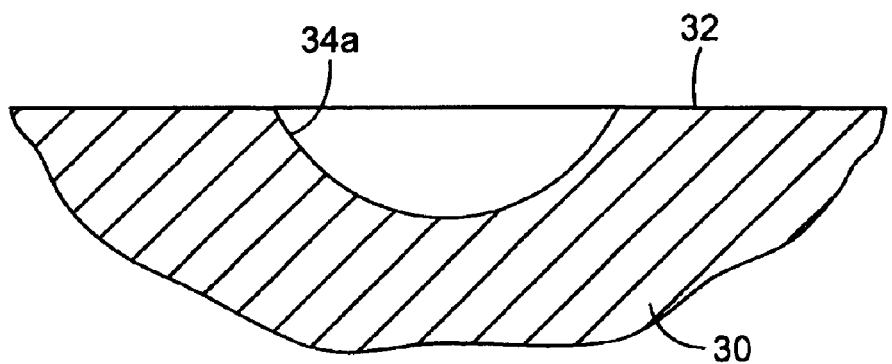
FIG. 3A is a cross-sectional view of the depression of FIG. 2, taken along line 3—3 in FIG. 2 at one point during formation of the depression.
Figure 3B:
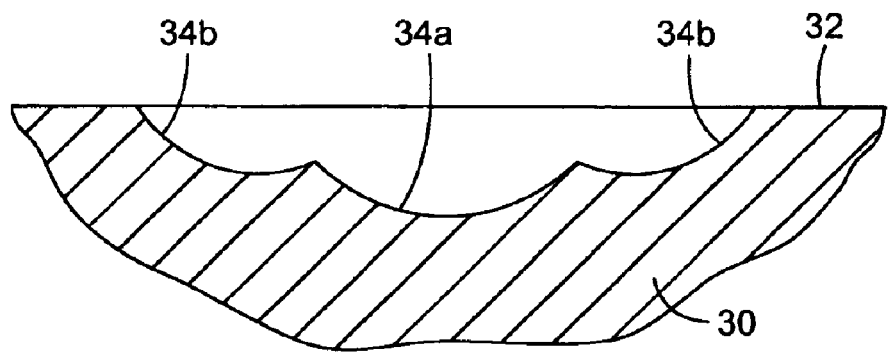
FIG. 3B is a cross-sectional view of the depression of FIG. 2, taken along line 3—3 in FIG. 2 at another point during formation of the depression.
Figure 3C:
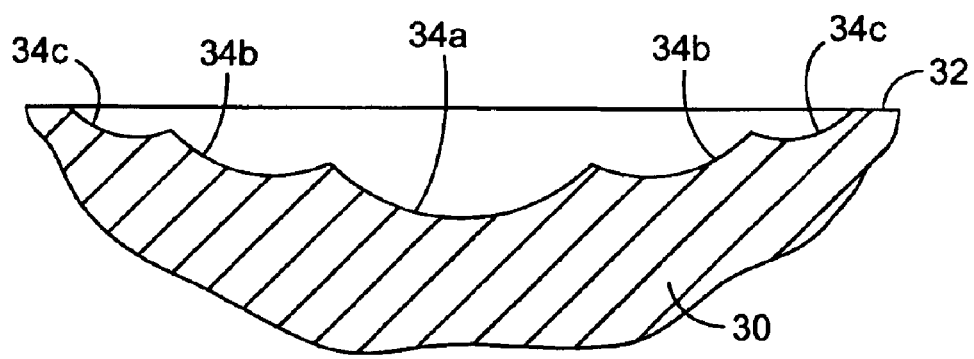
FIG. 3C is a cross-sectional view of the depression of FIG. 2, taken along line 3—3 in FIG. 2 during formation of the depression.

The depression 34 is preferably a composite of cells 34a, 34b, 34c and 34d formed in the surface 32 by any suitable technique, e.g., machining, etching, laser ablation, etc. FIGS. 3A–3C depict one set of steps that can be used to manufacture a composite depression 34 in the transfer roll 30 as seen in FIG. 2. The views in FIGS. 3A–3C are taken along line 3—3 in FIG. 2 and, as a result, do not include the smallest cells 34d seen in FIG. 2.

Further, the complete outline of each of the cells is depicted in FIG. 2 for a better understanding of the invention, although it will be understood that portions of each of the cells may not actually be visible in the finished composite depression 34. In addition, the depicted composite depression 34 is made of a multiple circular cells 34a–34d. It should, however, be understood that composite depressions according to the present invention may be made of cells having any selected shape, e.g., oval, square, triangular, etc. Further, the composite depressions of the present invention may be constructed of cells having a variety of shapes and/or sizes.

In the depicted composite depression 34, cells 34a have the largest diameter and are formed to the greatest depth into the surface 32. Further, the cells 34a may be formed first as seen in FIG. 3A. Alternatively, the smaller cells may be formed first with the larger cells formed later. The cells 34b may be formed next as depicted in FIG. 3B. Cells 34b are, in the depicted embodiment, formed to a shallower depth in the transfer roll 30 than cell 34a. It can be seen there that the cells 34b overlap the larger cell 34a, such that not all of the outline of the smaller cells 34b is actually formed into the transfer roll 30.

The final step depicted in FIG. 3C is the formation of smaller cells 34c farther outward from the central cell 34a than cells 34b. In the depicted embodiment, these outer cells 34c are formed to a shallower depth than cells 34b, thereby contributing to the general thinning at the edges of a reinforcing discrete polymeric region as seen in, e.g., FIG. 1.

Although not wishing to be bound by any theory, it is hypothesized that the features (e.g., edges, ridges, etc.) formed at the boundaries between the various cells in the composite structure of depression 34 may enhance its ability to retain molten thermoplastic composition during the transfer process as discussed below.

The depressions on transfer rolls used in connection with the present invention may be characterized in terms of the area occupied by their footprint on the exterior surface of the forming tool, a maximum dimension of the footprint (in any direction on the surface of the roll), the volume of the depression, the shape of the footprint, etc.

When characterized in terms of the area occupied by the footprint of the depressions, each of the depressions 34 may have a footprint with an area of about 4 square millimeters ($mm^2$) or more. In other situations, each of the depressions 34 may have footprints with an area of about 8 $mm^2$ or more.

Another manner in which the depressions may be characterized is in terms of the largest footprint dimension as measured on the surface 32 of the transfer roll 30. When characterized in terms of the largest footprint dimension of the footprint, it may be that the depressions have a largest footprint dimension of about 2 mm or more, in some instances about 5 mm or more.

Yet another manner in which the depressions used in connection with the present invention may be characterized is in terms of depression volume. For example, the depressions may have a depression volume of at least about three (3) cubic millimeters ($mm^3$) or more, or alternatively a depression volume of about five (5) cubic millimeters or more. Volume may be important because at least some of the molten thermoplastic composition may be retained within the depression during the transfer process, i.e., the depression volume may preferably be oversized relative to the preferred volume of the discrete polymeric regions to be formed by the depressions to compensate for retention of thermoplastic composition within the depressions.

The orientation of the depression 34 on a transfer roll 30 may be selected based on a variety of factors. The elongated depression 34 may be aligned in the machine direction (i.e., the direction of travel of a substrate), in the cross-web direction (i.e., transverse to the direction of travel of the substrate), or any other orientation between machine direction or cross-web direction.

Figure 4:
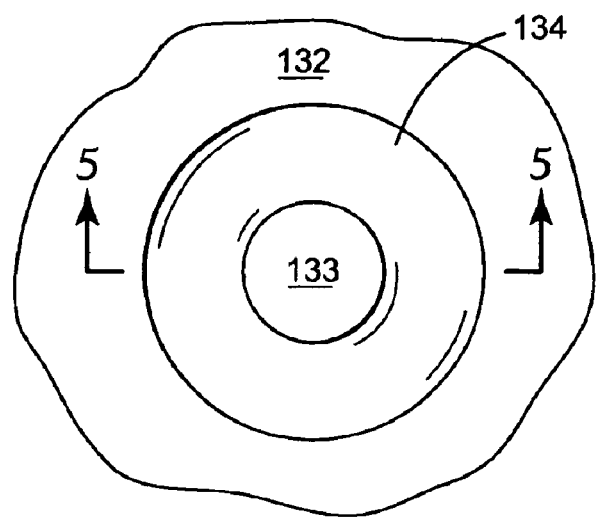
FIG. 4 is a plan view of another depression on a portion of a transfer roll that can used to manufacture reinforcing discrete polymeric regions on a composite web according to the methods of the present invention.
Figure 5:
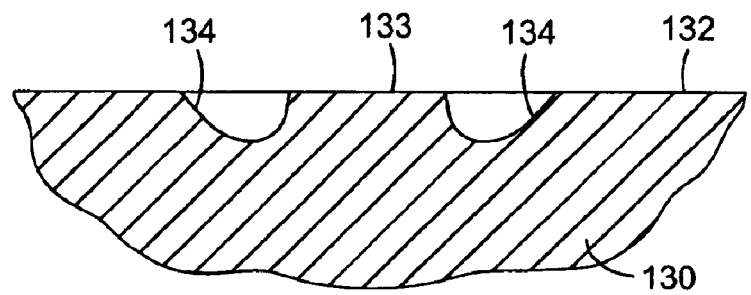
FIG. 5 is a cross-sectional view of the depression of FIG. 4, taken along line 5—5 in FIG. 4.

FIGS. 4 and 5 depict yet another variation in the shape of depressions formed in transfer tools used to provide reinforcing discrete polymeric regions on substrates in connection with the methods of the present invention. The depression 134 is located in the surface 132 of a transfer tool in the shape of a circular trough with an island 133 located in the center of depression 134 formed in the exterior surface 132.

Depressions that include islands such as that depicted in FIG. 4 can be used to provide reinforcing discrete polymeric regions on a substrate in which a portion of the substrate is exposed within a surrounding ring of polymer. The resulting construction may, for example, be used to reinforce the substrate in the area of, e.g., a buttonhole, slot, perforation, or other opening formed on in the substrate. Other uses for similar structures may also be envisioned.

The island 133 formed in the center of depression 134 is preferably the same height as the exterior surface 132 of the transfer roll that surrounds the depression 134. Although the depression 134 is depicted with only a single island 133 formed therein, depressions used in connection with the methods of the present invention may include two or more islands located within each depression if so desired. Furthermore, the shape of the island and surrounding depression may also vary, e.g., a depression that has a circular outermost perimeter may be paired with an island having a different shape. In another variation, the island may not be centered within the depression as depicted in FIG. 4.

Another variation depicted in FIG. 5 is the variation in depth of the depression 134, with the depression being deepest proximate the island and rising to a shallower depth at the outermost perimeter of the depression 134. Such a construction may provide a reinforcing discrete polymeric region with more flexible edges due to thinning of the polymeric region as discussed above in connection with FIG. 1. Further, although the depression 134 is not depicted as having a composite construction as does depression 34 in FIG. 2, the depression 134 including island 133 may advantageously be formed as a composite depression of multiple cells.

Figure 6:
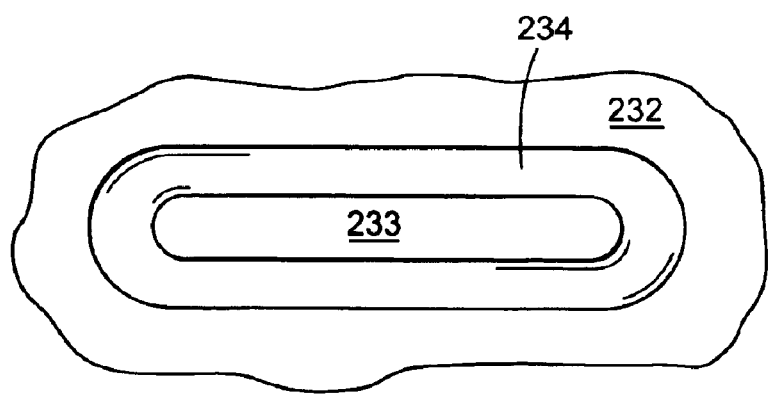
FIG. 6 is a plan view of another depression on a portion of a transfer roll that can used to manufacture reinforcing discrete polymeric regions on a composite web according to the methods of the present invention.

FIG. 6 depicts another depression 234 formed in the surface 232 of a transfer tool, with the depression 234 also including an island 233 in a manner similar to the depression 134 of FIGS. 4 and 5. Unlike depression 134, the depression 234 is elongated in a generally oval shape that may be more conducive to the formation of a buttonhole or similar structure. Again, although the depression 234 is not depicted as having a composite construction as does depression 34 in FIG. 2, it may advantageously be formed as a composite depression of multiple cells.

Figure 7:
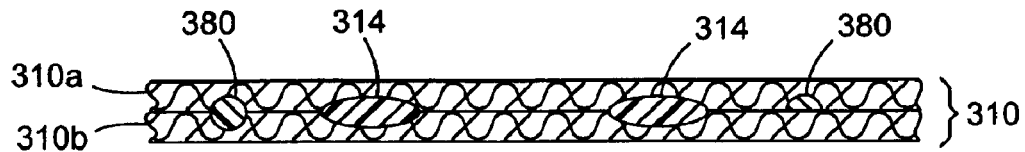
FIG. 7 is a cross-sectional view of a composite web manufactured according to the methods of the present invention including reinforcing discrete polymeric regions between two substrates.
Figure 8:
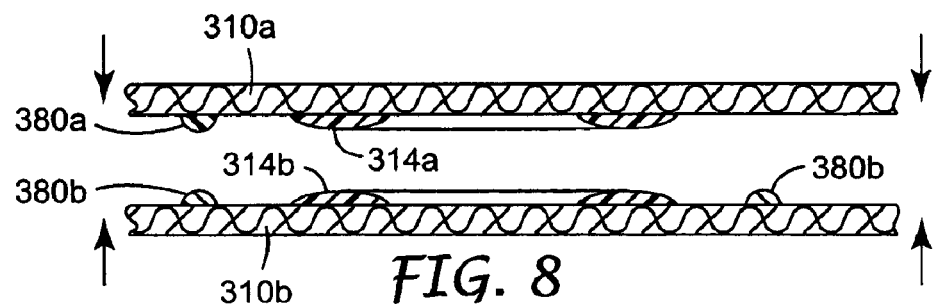
FIG. 8 is a cross-sectional view of the composite web of FIG. 7, before attachment of the two substrates to form the composite web in accordance with the methods of the present invention.

FIGS. 7 and 8 depict yet another variation in a composite web manufactured according to the methods of the present invention. The composite web of FIG. 7 is a laminated structure including a first substrate 310a laminated to a second substrate 310b to form a laminated substrate 310. A number of discrete polymeric regions 314 are located between the two substrates 310a and 310b. A number of smaller discrete polymeric regions 380 are depicted as being located between the larger discrete polymeric regions 314. The smaller discrete polymeric regions 380 are optional, i.e., they may not be required in addition to the larger discrete polymeric regions 314. These smaller features may be helpful to attach the two substrates 310a and 310b together between the larger discrete polymeric regions 314.

In some instances, attachment of the two substrates 310a and 310b may be accomplished using the discrete polymeric regions 314 and 380 alone when the lamination is performed while the polymer regions 314 and 380 are still in a somewhat molten state such that they can bond with counterpart discrete polymeric regions on the opposing substrate or to the opposing substrate itself. One advantage of this construction is that the lamination may be accomplished without the need for additional materials and/or process steps. The lamination between substrates 310a and 310b may alternatively be assisted by a variety of materials and/or techniques known to those skilled in the art, e.g., thermal bonding, adhesives, resins, tie films/webs, etc. See, e.g., U.S. Pat. No. 2,787,244 (Hickin); U.S. Pat. No. 3,694,867 (Stumpf); U.S. Pat. No. 4,906,492 (Groshens); U.S. Pat. No. 5,685,758 (Paul et al.); and U.S. Pat. No. 6,093,665 (Sayovitz et al.).

The laminated construction of FIG. 7 may be useful, for example, to provide a cloth-like or softer feel or appearance, breathability, porosity, etc. on both sides of the composite web. This is in contrast to the composite webs in which the discrete polymeric regions are located on an exposed surface of the composite web. A laminated composite web structure such as that seen in FIG. 7 may also be used to provide different properties on opposite sides of the composite web structure. For example, the porosity or other properties may differ between the different substrates 310a and 310b.

FIG. 8 depicts lamination of the substrates 310a and 310b by forces operating in the directions of the arrows located at both sides of the figure. One of the aspects depicted in FIG. 8 is the combination of discrete polymeric regions 314a on substrate 310a with discrete polymeric regions 314b located on the opposing surface of substrate 310b to form the discrete polymeric regions 314 in the composite web as depicted in FIG. 7.

Another aspect depicted in FIG. 8 is that the smaller polymeric regions 380 seen in FIG. 7 may be constructed from the combination of a polymeric region 380a on substrate 310a and a polymeric region 380b on substrate 310b. In other instances, the smaller polymeric region is located on only one of the substrates 310a or 310b and preferably bonds directly to the opposing substrate during lamination. Similarly, in some instances the larger discrete polymeric regions 314 may be formed by depositing polymer on only one of the substrates 310a or 310b before attaching the opposing substrate.

Another potential advantage of the laminated construction of the composite web seen in FIGS. 7 and 8 is that the reinforcing discrete polymeric regions 314 formed by laminating two separate polymeric regions 314a and 314b together may provide a combined reinforcing discrete polymeric region 314 that contains more polymer than could be effectively deposited as a single reinforcing discrete polymeric region using the methods of the present invention. That additional polymer may provide reinforcing discrete polymeric regions that are stiffer, thicker, or have other advantageous features.

Figure 9:
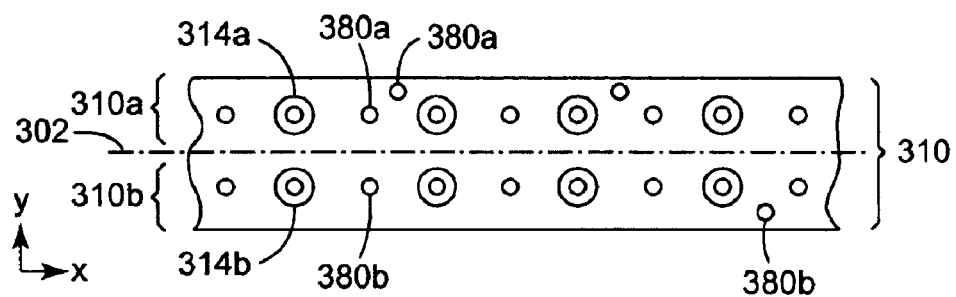
FIG. 9 is a plan view of one illustrative substrate with reinforcing discrete polymeric regions formed thereon that can be manufactured into a composite web according to the methods of the present invention.

FIG. 9 is a plan view of a composite web that may be used to form the composite web depicted in FIG. 7 in which two portions 310a and 310b of a single, unitary substrate 310 can be folded along a fold line 302 to provide the laminated structure of FIGS. 7 and 8. Alternatively, the substrates 310a and 310b as seen in, e.g., FIG. 8, may be separate from each other before lamination. The substrate 310 includes opposing reinforcing discrete polymeric regions 314a and 314b on portions 310a and 310b that are combined when the substrate 310 is folded along fold line 302.

The substrate 310 also includes a number of opposing smaller discrete polymeric regions 380a and 380b on portions 310a and 310b that are combined when the substrate 310 is folded along fold line 302. Further, the substrate 310 includes some smaller discrete polymeric regions 380a and 380b that do not oppose any similar deposits on the opposite side of the fold line 302.

Although the discrete polymeric regions 314a and 314b are shown as being uniformly spaced over the surface of the substrate 310 in a regular, repeating pattern (in both the x and y directions), it should be understood that spacing between the reinforcing discrete polymeric regions 314a and 314b may be non-uniform if so desired. Furthermore, the pattern in which the reinforcing discrete polymeric regions are arranged, may be irregular and/or non-repeating.

In other variations, portions of the composite webs manufactured in accordance with the present invention may include uniformly-spaced discrete polymeric regions as depicted in FIG. 9 while other portions of the same composite web may be free of any discrete polymeric regions. In yet another alternative, portions of the composite web manufactured in accordance with the present invention may include uniformly spaced discrete polymeric regions as seen in FIG. 9, while other portions of the same composite web may include discrete polymeric regions that are arranged in a non-uniform and/or non-repeating patterns. Further, different portions of a composite web manufactured according to the present invention may include different sets of discrete polymeric regions that are both uniformly spaced in repeating patterns that are different from each other.

The discrete polymeric regions could be provided in any desired shape, e.g., squares, rectangles, hexagons, etc. The shapes may or may not be in the form of recognized geometric shapes, but may be randomly formed with irregular perimeters. In addition, the shapes may not necessarily be solid figures, but may include islands formed within the shape in which none of the thermoplastic composition is transferred. In yet another alternative, some or all of the discrete polymeric regions may be in the form of indicia, i.e., letters, numbers, or other graphic symbols.

Figure 10:
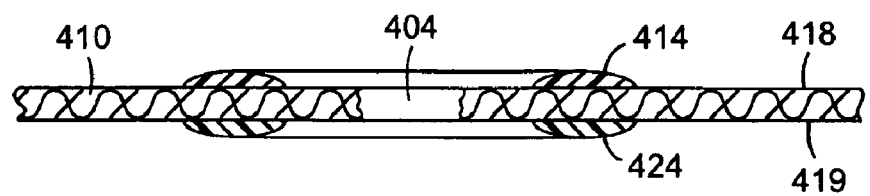
FIG. 10 is a cross-sectional view of another composite web with reinforcing discrete polymeric regions on both major surfaces of a substrate.

FIG. 10 illustrates yet another embodiment of a composite web manufactured in accordance with the present invention. The composite web includes a substrate 410 with opposing major surfaces 418 and 419. One feature illustrated in FIG. 10 is the two-sided nature of the reinforcing discrete polymeric regions located on the opposing major surfaces 418 and 419, respectively. Reinforcing discrete polymeric region 414 is provided on major surface 418 and reinforcing discrete polymeric region 424 is provided on opposing major surface 419. Both discrete polymeric region 414 and discrete polymeric region 424 are exposed on opposite sides of the composite web.

The discrete polymeric regions on opposing major surfaces are depicted as being in registration through the substrate 410. In other words, the discrete polymeric region 414 is aligned with the discrete polymeric region 424 on the opposite side of the substrate 410. Further, the discrete polymeric region 414 is depicted as being substantially the same size as the discrete polymeric region 424 located on the opposite side of the substrate 410. It should, however, be understood that when a composite web having discrete polymeric regions on both major surfaces is desired, the discrete polymeric regions on the opposing surfaces may or may not be the same size as seen in FIG. 10. Also, it should be understood that the discrete polymeric regions may or may not be in registration with each other through the substrate 410 as seen in FIG. 10.

The reinforcing discrete polymeric regions 414 and 424 may be envisioned as forming a grommet structure on the substrate 410. As a result, it may be desired to provide an optional opening 404 through the substrate 410 as seen in FIG. 10. The opening may be formed by any suitable technique, e.g., mechanical perforation with a tool, laser ablation, water or gas-jet cutting, etc. It will be understood that similar openings could be provided in, e.g., the laminated composite web seen in FIG. 7 as well.

Figure 11:
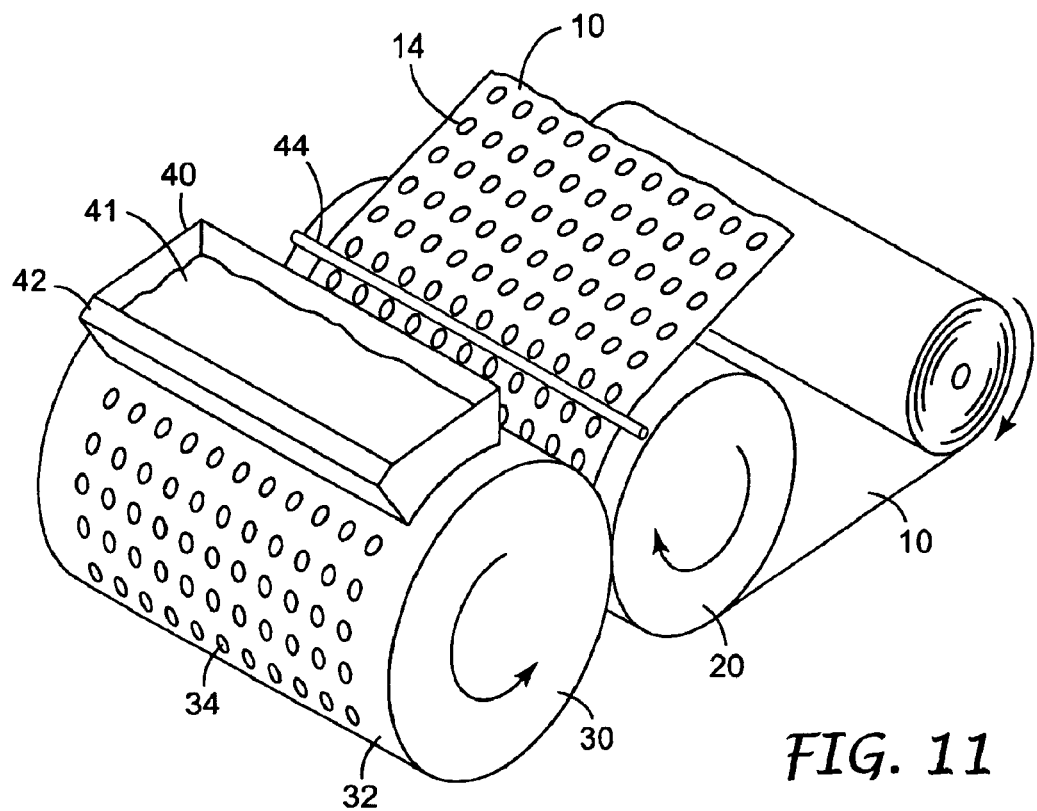
FIG. 11 is a perspective view of one polymer transfer process useful in providing discrete polymeric regions on a substrate in accordance with the methods of the present invention.

FIG. 11 is a perspective view of one system and method of providing discrete polymeric regions on one surface of a substrate 10 in accordance with the principles of the present invention. The system depicted in FIG. 11 includes a substrate 10 that defines a web path through the system. The substrate 10 moves through the system in a downstream direction indicated by the rotation arrows on the various rolls. After being unwound or otherwise provided from a supply (e.g., the substrate 10 may be manufactured in-line with the system depicted in FIG. 11), the substrate 10 is directed into a transfer nip formed between a backup roll 20 and a transfer roll 30.

The process of providing discrete polymeric regions on the substrate 10 includes delivering a supply of a molten thermoplastic composition to the exterior surface 32 of transfer roll 30 that includes a one or more depressions 34 formed in its exterior surface 32. The molten thermoplastic composition 41 is supplied to the exterior surface 32 of the transfer roll 30 by a delivery apparatus in the form of a trough 40 (or other supply apparatus, e.g., extruder, gear pump, etc.).

The excess molten thermoplastic composition is wiped or removed from the exterior surface 32 by a doctor blade 42 acting against the exterior surface 32 of the transfer roll 30. Although it may be ideal to remove all of the thermoplastic composition from the exterior surface 32 of the transfer roll 30, some of the thermoplastic composition may remain on the exterior surface 32 after wiping by the doctor blade 42.

The depressions 34 formed in the exterior surface 32 of the transfer roll 30 preferably receive a portion of the molten thermoplastic composition when the molten thermoplastic composition is deposited on the exterior surface 32 of the transfer roll 30. If the depressions 34 are not completely filled during or by the deposition of molten thermoplastic composition, the wiping action of the doctor blade 42 on the exterior surface 32 of the transfer roll 30 may assist in substantially filling the depressions with molten thermoplastic composition.

Control over the temperatures of the various rolls in the system depicted in FIG. 11 may be useful in obtaining the desired products. It may be preferred, e.g., that the exterior surface 32 of the transfer roll 30 be heated to a selected temperature that is at or above the melt temperature of the thermoplastic composition to be transferred to the substrate 10. Heating the transfer roll 30 may also enhance filling of the depressions 34 by the molten thermoplastic composition.

Because the molten thermoplastic composition 41 is itself heated within the trough 40, the doctor blade 42 will typically be heated by the molten thermoplastic composition. It may alternatively be desirable to control the temperature of the doctor blade 42 separately from the trough 40 containing the molten thermoplastic composition 41. For example, it may be desirable to heat the doctor blade 42 to a temperature above the melt temperature of the molten thermoplastic composition.

Figure 11A:
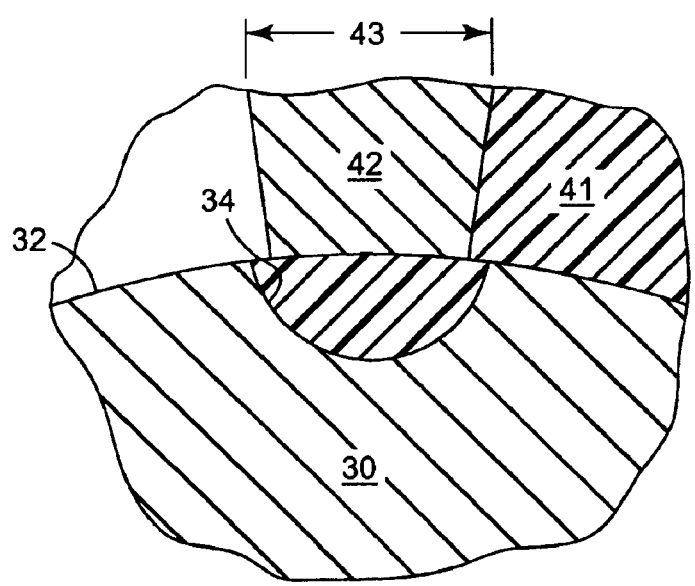
FIG. 11A is an enlarged schematic diagram depicting the relationship between a doctor blade and a depression on a transfer roll used in connection with the present invention.

FIG. 11A is an enlarged partial cross-sectional view depicting one relationship between a doctor blade 42 and depression 34 in a transfer roll 30. Another characteristic of the doctor blade 42 that may be controlled is its thickness or length 43 along the exterior surface of the transfer roll 30 (as measured in the machine direction or the direction of rotation of the transfer roll). For example, a thicker or longer doctor blade 42 may help by allowing the molten thermoplastic composition more time to relax within the depressions 34, thereby improving filling of the depressions. In addition to varying the length of the doctor blade 42, the pressure or force exerted on the transfer roll 30 by the doctor blade 42 may also be adjusted based on a variety of factors including, e.g., the characteristics of the molten thermoplastic composition, the transfer roll characteristics, etc.

With the depressions 34 at least partially filled with the desired molten thermoplastic composition, the transfer roll 30 continues to rotate until the depressions 34 and the molten thermoplastic composition they contain are forced into contact with the substrate 10 against backup roll 20 at the transfer nip (i.e., the nip formed by the transfer roll 30 and the backup roll 20. It is at this point that transfer of the molten thermoplastic composition in the depressions 34 to the substrate 10 begins. It should be understood that under certain conditions, only a portion of the thermoplastic composition in the depressions 34 may transfer to the substrate 10.

When a substrate 10 that includes one or more porous major surfaces on which the molten thermoplastic composition is deposited is used in connection with the methods of the present invention, a mechanical bond is preferably formed by infiltration of the molten thermoplastic composition into the porous surface of the substrate 10. As used in connection with the present invention, the term "porous" includes both structures that include voids formed therein, as well as structures formed of a collection of fibers (e.g., woven, nonwoven or knit) that allow for the penetration of molten thermoplastic compositions.

The nip pressure between the transfer roll 30 and the backup roll 20 is preferably sufficient such that a portion of the thermoplastic composition in the discrete polymeric regions infiltrates and/or encapsulates a portion of the porous substrate 10 to improve attachment of the discrete polymeric regions to the substrate 10. Where the surface of the substrate 10 includes fibers (e.g., where the substrate 10 includes woven, nonwoven, or knit materials on its major surfaces), it may be preferred that the thermoplastic composition encapsulate all or a portion of at least some of the fibers on the surface of the substrate 10 to improve attachment of the discrete polymeric regions to the substrate 10.

Under some conditions the molten thermoplastic composition in the depressions 34 may completely permeate the substrate 10 if, e.g., the substrate 10 is porous throughout its thickness. In other instances, penetration of the molten thermoplastic composition may be limited to the outer layer or layers of the substrate 10.

It should, however, be understood that although the outer surfaces of the substrate 10 may exhibit some porosity, that porosity may not necessarily extend through the entire thickness of the substrate 10. For example, the substrate 10 may have a variety of different layers, with one of the layers being substantially non-porous. In another alternative, the overall thickness of the substrate 10 may render it non-porous as a whole, even though the outer surfaces of the substrate 10 exhibit some porosity as discussed above.

The backup roll 20 may possess a variety of different characteristics depending on the types of substrate materials and/or molten thermoplastic compositions being processed. In some instances, the exterior of the backup roll 20 may be a rubber or other conformable material that conforms to the shape of the transfer roll 30. If a conformable material such as rubber is used, it may, e.g., have a durometer of, e.g., about 10–90 Shore A.

Figure 11B:
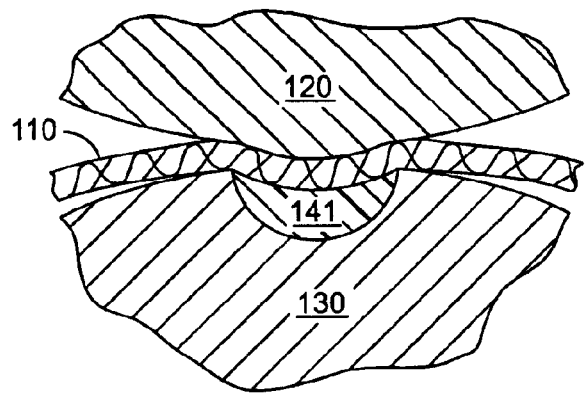
FIG. 11B is an enlarged partial cross-sectional view depicting a conformable backup roll forcing a substrate against a transfer roll.

One such variation at the transfer nip is depicted in FIG. 11B, in which a conformable backup roll 130 is depicted as forcing a portion of the substrate 110 into the depression 134 (and the thermoplastic composition 141 contained therein). If the surface of the substrate 110 facing the depression 134 is porous, a portion of the molten thermoplastic composition 141 may be forced in the porous surface of the substrate 110. Forcing the substrate 110 into the depression may be particularly beneficial if the depression 134 is not completely filled with the molten thermoplastic composition 141 to improve the likelihood of contact between the substrate 10 and the molten thermoplastic composition 141.

Figure 11C:
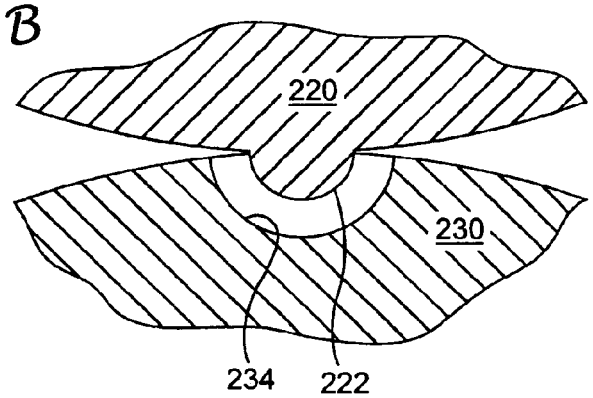
FIG. 11C is an enlarged partial cross-sectional view depicting a mating backup roll including protrusions aligned with depressions in the transfer roll.

Alternatively, the surface of the substrate may be forced into the depressions on the transfer roll using a mating backup roll. This variation at the transfer nip is depicted in FIG. 11C in which the backup roll 220 includes protrusions 222 that are complementary to or mate with the depressions 234 on the transfer roll 230. The protrusions 222 would preferably force a substrate into the depressions with the same results and benefits described above with respect to FIG. 11B. A mating backup roll 220 could be formed of any conformable material, nonconformable material, or combination of conformable or nonconformable materials.

Heating or otherwise controlling the temperature of the transfer roll is discussed above. It should also be appreciated that the temperature of the exterior surface of the backup roll may be controlled. For example, it may be desirable to cool the surface of the backup roll to a selected temperature below the temperature of the transfer roll. Cooling of the backup roll may be beneficial in maintaining the integrity of the substrate, particularly if the substrate integrity can be degraded from the heat of the transfer roll (if the transfer roll is heated) and/or the molten thermoplastic composition in the depressions of the transfer roll.

The substrate 10 continues around the backup roll 20 as seen in FIG. 11. In some instances, a portion of the molten thermoplastic composition in the depressions may remain in the depressions 34 while the substrate 10 is pulled away from the transfer roll 30. As a result, the molten thermoplastic composition in the depressions 34 may tend to elongate or string between the depressions in transfer roll 30 and the substrate 10.

A device, such as a hot wire 44 seen in FIG. 11, may be used to sever any strands of thermoplastic composition that may be formed as the substrate 10 separates from the transfer roll 30. Other devices and/or techniques may be used to accomplish the desired severing of any molten thermoplastic composition strands. Examples may include, but are not limited to hot air knives, lasers, etc. Furthermore, under certain conditions, stringing of the thermoplastic composition may not be encountered during manufacturing.

The tendency of the molten thermoplastic composition in the depressions 34 to string as the substrate exits the transfer nip also raises another issue that should be considered when developing processes according to the present invention. That issue is the internal cohesive strength of the substrate 10 and/or the tensile strength of the substrate 10. This issue may be of more concern if the substrate 10 includes a fibrous construction (e.g., woven, nonwoven, or knit fibers) that could be separated from the remainder of the substrate by the forces exerted when the substrate 10 is pulled away from the transfer roll 30. These considerations may be more important if the molten thermoplastic composition has properties (e.g., tackiness, tensile strength, etc.) such that strands of the molten thermoplastic composition can exert forces on the substrate 10 that exceed the internal cohesive strength and/or tensile strength of the substrate 10.

For example, if the substrate 10 includes a resin-bonded nonwoven portion, the temperature of the transfer roll 30 and/or molten thermoplastic composition may rise above the melting temperature of the resin, thereby potentially degrading the internal cohesive strength and/or tensile strength of the substrate 10. Alternatively, a nonwoven substrate may include fibers that have a melting temperature similar to the temperature of the transfer roll 30 and/or molten thermoplastic composition, thereby potentially degrading the internal cohesive strength and/or tensile strength of the substrate 10.

In either instance, the roll temperatures and/or molten thermoplastic composition temperature may need to be controlled to maintain the integrity of the substrate while transferring the molten thermoplastic composition. For example, the backup roll 20 may be cooled to, in turn, cool the substrate 10 to maintain its internal cohesive strength.

In another alternative, heating of the transfer roll 30 and/or backup roll 20 may be used to enhance the internal cohesive strength and/or tensile strength of the substrate 10. For example, if the substrate 10 includes multi-component fibers or fibers having different compositions, some consolidation of the fibers or other components in the substrate 10 may be caused by heating the substrate 10 while transferring the molten thermoplastic composition from the transfer roll 30 to the substrate 10. That consolidation may improve the integrity of the substrate by forming a skin layer or other strength-enhancing structure on or within the substrate 10. Some exemplary processes may be described in, e.g., U.S. Pat. No. 5,470,424 (Isaac et al.).

Although the system and method depicted in FIG. 11 produces composite webs with reinforcing discrete polymeric regions on only one major side thereof, those of skill in the art will recognize the modifications required to provide discrete polymeric regions on both major surfaces of the substrate in accordance with the principles of the present invention. One example may include, e.g., forming discrete polymeric regions on one surface of each of two separate substrates, with the two substrates then being laminated together to form a single substrate with discrete polymeric regions on both major surfaces (see, e.g., FIG. 10). Alternatively, a single substrate may be directed into a nip formed by two transfer rolls, with each of the transfer rolls depositing discrete polymeric regions on both sides of the web essentially simultaneously.

Figure 12:
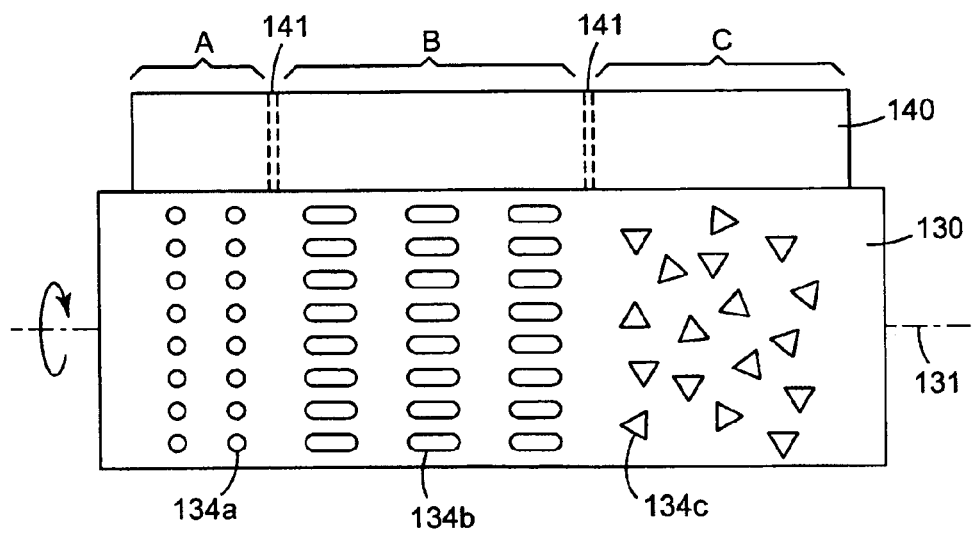
FIG. 12 illustrates another transfer roll and polymer source useful in connection with zoned delivery systems and methods.

Although FIG. 11 depicts the application of only one thermoplastic composition using the transfer roll 30, it will be understood that two or more different thermoplastic compositions may be applied to the exterior surface of the transfer roll 30. FIG. 12 depicts a portion of one system in which a trough 340 is used to deliver three molten thermoplastic compositions (in zones A, B, & C) to the surface of a transfer roll 330 that rotates about an axis 331. The trough 340 may, for example, include barriers 342 such that molten thermoplastic compositions in the different zones of the trough 340 do not mix during processing. In another alternative, separate and distinct troughs could be used for each different thermoplastic composition to be applied to the transfer roll 330.

The transfer roll 330 also includes different sets of depressions 334a, 334b, and 334c over which the different molten thermoplastic compositions may be applied. The depressions in the different zones on transfer roll 330 are differently shaped, have different sizes, and have different spacings. For example, the triangular depressions in zone C are arranged in an irregular, non-repeating pattern while the depressions in zones A & B are arranged in regular, repeating patterns.

With the system of FIG. 12, different sets of discrete polymeric regions may be formed on a single substrate using different thermoplastic compositions. As a result, the thermoplastic compositions may be selected for any of a number of different properties related to manufacturing or end-use performance of the finished articles made using the composite webs.

Figure 13:
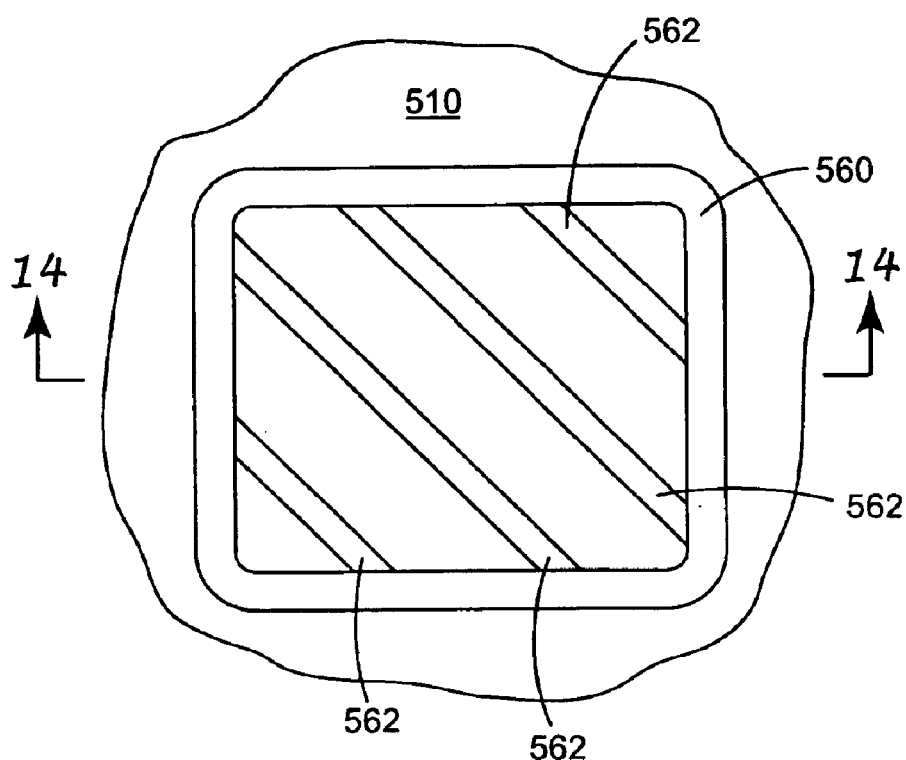
FIG. 13 is a plan view of one article formed in a composite web by providing reinforcing discrete polymeric regions on a substrate according to the methods of the present invention.
Figure 14:
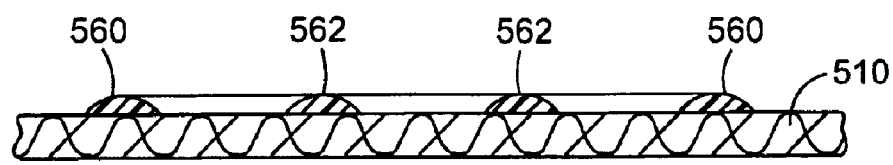
FIG. 14 is a cross-sectional view of the article of FIG. 13 taken along line 14—14 in FIG. 13.

FIGS. 13 and 14 depict an article that may be manufactured from a composite web according to the methods of the present invention, with FIG. 13 being a plan view of the article and FIG. 14 being a cross-sectional view of the article taken along line 14—14 in FIG. 13. The article includes a frame 560 formed by a reinforcing discrete polymeric region on a substrate 510. The article may be, e.g., a filter in which the frame 560 provides an integral support for substrate 510 which functions as filter media. The frame 560, when deposited as a reinforcing discrete polymeric region, preferably does not require the use of bonding agents (e.g., adhesives, etc.) to secure the frame 560 to the filtration substrate 510.

The depicted article also includes one or more optional reinforcement strips 562 that extend across the central area of substrate 510 defined by the frame 560. The reinforcement strips 562 may also preferably be formed by discrete polymeric regions deposited on the substrate 510 according to the methods of the present invention. The reinforcement strips 562 may be formed of the same or different polymeric compositions as the frame 560.

Figure 15:
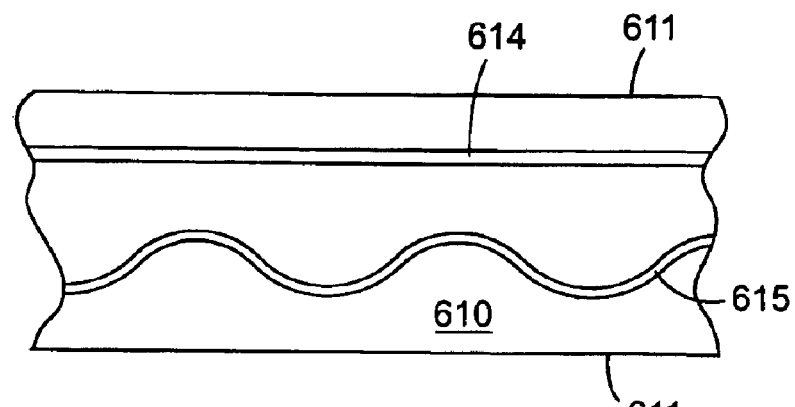
FIG. 15 is a plan view of a portion of one composite web manufactured according to the present invention.
Figure 16:
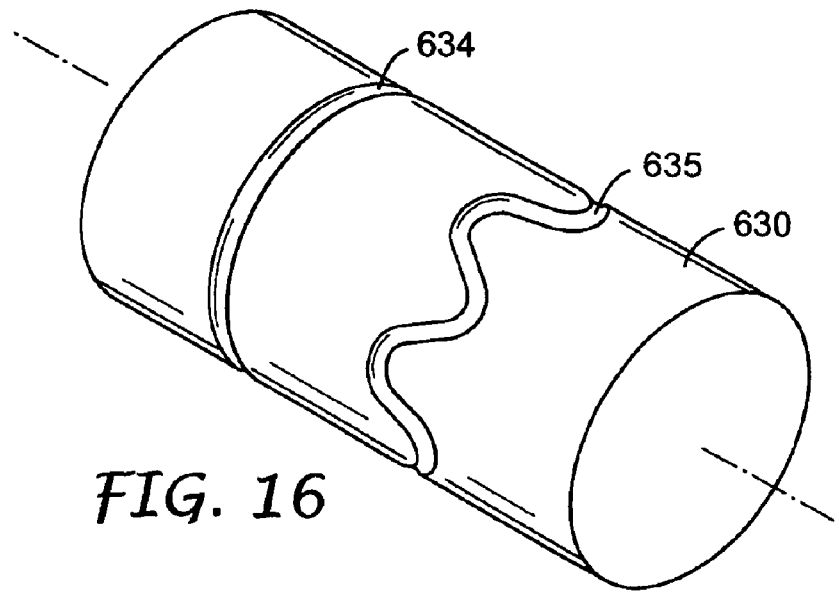
FIG. 16 is a perspective view of one transfer roll that may be used to manufacture the composite web of FIG. 15.

FIGS. 15 & 16 depict another variation associated with the methods of manufacturing composite webs according to the present invention. FIG. 15 depicts, in a plan view, a portion of a composite web manufactured according to the present invention. The composite web includes a substrate 610 on which two discrete polymeric regions 614 and 615 are located. The substrate 610 includes two opposing edges 611 that extend over the length of the composite web and, together, define the longitudinal length of the composite web.

Discrete polymeric region 614 is provided in the shape of a line of the thermoplastic composition material deposited on the substrate 610 along the general direction of the longitudinal length of the composite web. The discrete polymeric region 614 may be continuous along the longitudinal length of the composite web as shown in FIG. 15.

Discrete polymeric region 615 is a variation of discrete polymeric region 614 in that it is provided in an undulating shape as compared to the relative straight linear shape of the discrete polymeric region 614. The undulating shape of the discrete polymeric region 615 also, however, extends along the direction of the longitudinal length of the composite web. Further, the discrete polymeric region 615 may be continuous along the longitudinal length of the composite web as shown in FIG. 15.

FIG. 16 is a perspective view of one transfer roll 630 that may be used to transfer molten thermoplastic compositions to a substrate in the shapes seen in FIG. 15 according to the methods of the present invention. The transfer roll 630 includes a depression 634 that preferably extends continuously around the outer circumference of the transfer roll 630 to form the discrete polymeric region 614 as depicted in FIG. 15. The transfer roll 630 also includes a depression 635 that also extends around the outer circumference of the roll 630 to form the discrete polymeric region 615 as depicted in FIG. 15.

Figure 17:
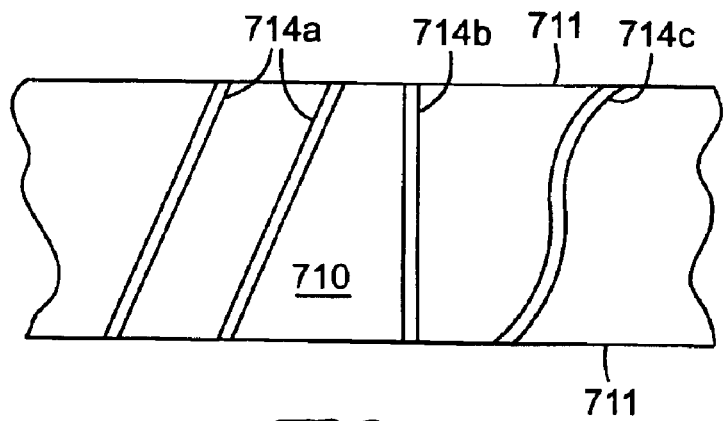
FIG. 17 is a plan view of a portion of one composite web manufactured according to the present invention that includes discrete polymeric regions extending across the width of the substrate.

FIG. 17 depicts another variation associated with the methods of manufacturing composite webs according to the present invention. FIG. 17 depicts, in a plan view, a portion of a composite web manufactured according to the present invention. The composite web includes a substrate 710 on which discrete polymeric regions 714a, 714b, and 714c are located, with the discrete polymeric regions extending across the width of the substrate. The substrate 710 includes two opposing edges 711 that extend over the length of the composite web and, together, define the width and the longitudinal length of the composite web.

Each of the discrete polymeric regions 714a, 714b, and 714c is provided in the shape of a line of the thermoplastic composition material deposited on the substrate 710 in a generally cross-web direction, i.e., extending between the opposing edges 711 of the substrate 710. The discrete polymeric regions 714a, 714b, and 714c present variations from straight lines 714a and 714b to undulating line 714c. Many other variations in placement, shape and/or orientation of reinforcing discrete polymeric regions may be envisioned in connection with methods according to the present invention.

In addition to the deposition of nonelastic thermoplastic polymer in discrete regions, it is also contemplated that additional materials can be coated onto a major surface of the substrate using known methods. Such materials could be, for example adhesives, as described in, e.g., U.S. Pat. No. 5,019,071 (Bany et al.); U.S. Pat. No. 5,028,646 (Miller et al.); and U.S. Pat. No. 5,300,057 (Miller et al.); or cohesives as described in, e.g. U.S. Pat. No. 5,389,438 (Miller et al.) and U.S. Pat. No. 6,261,278 (Chen et al.).

EXAMPLES

The following examples are provided to enhance understanding of the present invention. They are not intended to limit the scope of the invention.

Example 1

A web of the present invention was produced using a system similar to that shown in FIG. 11. A 40 mm diameter twin screw extruder fitted with a gear pump was used to deliver a molten polypropylene polymer (SC-917, Basell Olefins) at a melt temperature of approximately 227° C. to a neck tube. The neck tube was positioned such that a thick strand of molten polymer was extruded vertically downward onto the exterior surface 32 of an oil-heated steel transfer roll 30 having a diameter of 23 cm. The exterior surface of the transfer roll was machined using a computer controlled milling machine to have a circle of 8 depressions around the periphery of the roll near the center of the roll. The depressions were elliptical in shape 7.6 cm long and 1.9 cm in width at the widest point of the ellipse. The long axis of each ellipse was parallel to the machine direction (downweb). The ellipses were arranged with a center-to-center spacing of 8.9 cm. The elliptical depressions were machined in a seven step process.

Step 1 consisted of milling 0.333 mm depth cells using a 2 mm tool in a 7.6 cm by 1.9 cm elliptical pattern. Step 2 consisted of milling 0.500 mm depth cells using a 3 mm tool. Step 3 consisted of milling 0.666 mm depth cells using a 4 mm tool. Step 4 consisted of milling 0.833 mm depth cells using a 5 mm tool. Step 5 consisted of milling 0.999 mm depth cells using a 6 mm tool. Step 6 consisted of milling 1.165 mm depth cells using a 7 mm tool. Step 7 consisted of milling 1.332 mm depth cells using a 8 mm tool. The cells were positioned such that the deeper cells were in the middle of the ellipse with progressively shallower cells tapering outwards towards the perimeter of the ellipse.

After the depressions were filled or partially filled with the molten polymer, any excess molten polymer was removed from the exterior surface of the transfer roll by a brass doctor blade 42 having a thickness of 1.5 mm at the contact point with the roll, acting against and normal to the exterior surface of the transfer roll. The excess molten polymer formed a small rolling bank of polymer contained in a trough formed by the doctor blade and two side walls pressed firmly against the transfer roll using a pressure of 123 N/lineal cm. The transfer roll was at approximately 227° C. After the wiping action of the doctor blade, the transfer roll continued to rotate until the depressions and the molten polymer they contain were forced into contact with a nonwoven substrate (SONTARA 8001 spunlaced polyester, 40 grams/m$^2$, Dupont) against a rubber backup roll 20 (23° C.) using a nip pressure of 25 N/lineal cm.

Transfer of some of the molten polymer from the depressions to the nonwoven substrate occurred. A portion of the molten polymer in the depressions remained in the depressions while the substrate pulled away from the transfer roll. As a result, the molten polymer tended to elongate or string between the depressions in the transfer roll and the substrate. A hot wire 44 was used to sever any strands of molten polymer formed as the substrate separated from the transfer roll. The weight of each transferred reinforcing polymer region was 0.28 grams.

Example 2

To demonstrate that two or more discrete reinforcing polymer regions can be transferred to two substrates followed by lamination of the substrates, a web was prepared as in Example 1 using the apparatus shown in FIG. 11 except a second transfer roll, identical to the transfer roll 30, a second rubber backup roll, similar to the rubber backup roll 20, a second doctor blade, similar to the doctor blade 42, and a second hot wire, similar to the hot wire 44, were used to transfer a discrete reinforcing polymer region to a second nonwoven substrate (SONTARA 8001 spunlaced polyester, Dupont). Molten polypropylene polymer (SC-917, Basell Olefins) was delivered to the second transfer roll at a melt temperature of approximately 227° C. The second transfer roll was at approximately 227° C., and the second rubber backup roll was at approximately 23° C. A nip pressure of 25 N/lineal cm was used. The doctor blade pressure against the second transfer roll was approximately 123 N/lineal cm. The second transfer roll was adjusted so that it was in registration with the first transfer roll with respect to the depressions in each of the rolls. The rubber roll 20 and the second rubber roll formed a nip where the two nonwoven substrates containing the transferred reinforcing polymer regions were laminated such that the reinforcing regions on one of the substrates coincided with the reinforcing regions on the other substrate. This resulted in approximately double the mass of polymer that could be transferred as compared to Example 1.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated. Various modifications and alterations of this invention will become apparent to those skilled in the art without departing from the scope of this invention. It should be understood that this invention is not to be unduly limited to illustrative embodiments set forth herein.

What is claimed is:

1. A method for producing a composite web, the method comprising:

providing a transfer roll comprising an exterior surface that comprises one or more depressions formed therein, wherein the one or more depressions comprise at least one depression that comprises a composite depression formed by a plurality of cells, and wherein the one or more depressions comprise at least one depression that comprises an island located therein;

delivering a molten nonelastomeric thermoplastic composition onto the exterior surface of the transfer roll;

wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll; and transferring at least a portion of the molten nonelastomeric thermoplastic composition in the one or more depressions to a first major surface of a substrate by contacting the first major surface of the substrate to the exterior surface of the transfer roll and the molten nonelastomeric thermoplastic composition in the one or more depressions, followed by separating the substrate from the transfer roll, wherein one or more discrete polymeric regions comprising the nonelastomeric thermoplastic composition are located on the first major surface of the substrate after separating the substrate from the transfer roll.

2. A method according to claim 1, wherein the plurality of cells forming the composite depression overlap with each other.

3. A method according to claim 1, wherein the transferring further comprises forcing the first major surface of the substrate against the exterior surface of the transfer roll and the molten nonelastomeric thermoplastic composition in the one or more depressions.

4. A method according to claim 1, wherein the first major surface of the substrate comprises fibers, and further wherein the transferring further comprises encapsulating at least a portion of at least some of the fibers in the molten nonelastomeric thermoplastic composition by forcing the first major surface of the substrate against the exterior surface of the transfer roll and the molten nonelastomeric thermoplastic composition in the one or more depressions.

5. A method according to claim 1, wherein substantially all of the one or more depressions are substantially filled with the molten nonelastomeric thermoplastic composition after the wiping and before the transferring.

6. A method according to claim 1, wherein the at least one depression of the one or more depressions forms a discrete polymeric region on the first major surface of the substrate in which a portion of the first major surface of the substrate is located within a surrounding ring of the nonelastomeric thermoplastic composition, and wherein the method further comprises providing an opening through the substrate within the surrounding ring of the nonelastomeric thermoplastic composition.

7. A method according to claim 1, wherein the one or more depressions comprise a plurality of depressions comprising depressions having at least two different shapes.

8. A method according to claim 1, wherein each depression of the one or more depressions comprise a volume of about 3 cubic millimeters or more.

9. A method according to claim 1, wherein each depression of the one or more depressions defines a depression volume, and further wherein the one or more depressions comprises at least two depressions that define different depression volumes.

10. A method according to claim 1, wherein a footprint of each depression of the one or more depressions comprises an area of about 4 square millimeters or more.

11. A method according to claim 1, wherein the molten thermoplastic composition does not comprise tackifiers.

12. A method according to claim 1, further comprising heating the exterior surface of the roll to a temperature that is at or above a melt temperature of the thermoplastic composition.

13. A method according to claim 1, wherein the method further comprises laminating a second substrate to the first major surface of the first substrate, wherein the one or more discrete polymeric regions on the first substrate are located between the first substrate and the second substrate after laminating the second substrate to the first substrate.

14. A method according to claim 1, wherein the first major surface of the substrate comprises a porous surface, and wherein the transferring further comprises forcing a portion of the first major surface of the substrate into the one or more depressions, wherein a portion of the molten nonelastomeric thermoplastic composition in the one or more depressions infiltrates the porous surface within the one or more depressions.

15. A method according to claim 14, wherein the porous surface of the substrate comprises fibers, and further wherein the transferring further comprises encapsulating at least a portion of at least some of the fibers in the molten nonelastomeric thermoplastic composition.

16. A method for producing a composite web, the method comprising:

providing a transfer roll comprising an exterior surface that comprises one or more depressions formed therein, wherein the one or more depressions comprise at least one depression that comprises a composite depression formed by a plurality of overlapping cells;

delivering a molten nonelastomeric thermoplastic composition onto the exterior surface of the transfer roll;

wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll;

forcing a portion of a first major surface of a substrate into the one or more depressions, wherein the first major surface comprises a porous surface comprising fibers, and wherein a portion of the nonelastomeric thermoplastic composition in the one or more depressions infiltrates the porous surface, and still further wherein the molten nonelastomeric thermoplastic composition encapsulates at least a portion of at least some of the fibers; and separating the substrate from the transfer roll, wherein one or more discrete polymeric regions comprising the nonelastomeric thermoplastic composition are located on the first major surface of the substrate after separating the substrate from the transfer roll.

17. A method according to claim 16, wherein each depression of the one or more depressions defines a depression volume, and further wherein the one or more depressions comprises at least two depressions that define different depression volumes.

18. A method according to claim 16, wherein at least one discrete polymeric region of the one or more discrete polymeric regions comprises a shape extending continuously along a length of the substrate.

19. A method according to claim 16, wherein the one or more depressions comprise a plurality of depressions comprising depressions having at least two different shapes.

20. A method according to claim 16, wherein each depression of the one or more depressions comprise a depression volume of about 3 cubic millimeters or more.

21. A method according to claim 16, wherein a footprint of each depression of the one or more depressions comprises an area of about 4 square millimeters or more.

22. A method according to claim 16, wherein the molten thermoplastic composition does not comprise tackifiers.

23. A method according to claim 16, further comprising heating the exterior surface of the roll to a temperature that is at or above a melt temperature of the thermoplastic composition.

24. A method for producing a composite web, the method comprising:
providing a transfer roll comprising an exterior surface that comprises one or more depressions formed therein;
delivering a molten nonelastomeric thermoplastic composition onto the exterior surface of the transfer roll;
wiping the molten nonelastomeric thermoplastic composition from the exterior surface of the transfer roll, wherein a portion of the molten nonelastomeric thermoplastic composition enters the one or more depressions, and further wherein the portion of the molten nonelastomeric thermoplastic composition in the one or more depressions remains in the one or more depressions after wiping the molten nonelastomeric thermoplastic composition from the exterior surface of the transfer roll;
transferring at least a portion of the molten nonelastomeric thermoplastic composition in the one or more depressions to a first major surface of a first substrate by contacting the first major surface of the first substrate to the exterior surface of the transfer roll and the molten nonelastomeric thermoplastic composition in the one or more depressions, followed by separating the first substrate from the transfer roll, wherein one or more discrete polymeric regions comprising the nonelastomeric thermoplastic composition are located on the first major surface of the first substrate after separating the first substrate from the transfer roll; and
laminating a second substrate to the first major surface of the first substrate, wherein the one or more discrete polymeric regions on the first substrate are located between the first substrate and the second substrate after laminating the second substrate to the first substrate, wherein the second substrate comprises one or more discrete polymeric regions located on a first major surface of the second substrate prior to laminating the second substrate to the first substrate, and wherein the one or more discrete polymeric regions on the second substrate are located between the first substrate and the second substrate after laminating the second substrate to the first substrate.

25. A method according to claim 24, wherein the transferring further comprises forcing the first major surface of the first substrate against the exterior surface of the transfer roll and the molten nonelastomeric thermoplastic composition in the one or more depressions.

26. A method according to claim 24, wherein the first major surface of the first substrate comprises fibers, and further wherein the transferring further comprises encapsulating at least a portion of at least some of the fibers in the molten nonelastomeric thermoplastic composition by forcing the first major surface of the first substrate against the exterior surface of the transfer roll and the molten nonelastomeric thermoplastic composition in the one or more depressions.

27. A method according to claim 24, wherein the one or more depressions in the transfer roll comprise at least one depression that comprises a composite depression formed by a plurality of cells.

28. A method according to claim 24, wherein the molten thermoplastic composition does not comprise tackifiers.

29. A method according to claim 24, further comprising heating the exterior surface of the roll to a temperature that is at or above a melt temperature of the thermoplastic composition.

30. A method according to claim 24, wherein the laminating of the first substrate to the second substrate is not assisted by additional materials.

31. A method according to claim 24, wherein the first major surface of the first substrate comprises a porous surface, and wherein the transferring further comprises forcing a portion of the first major surface of the first substrate into the one or more depressions, wherein a portion of the molten nonelastomeric thermoplastic composition in the one or more depressions infiltrates the porous surface within the one or more depressions.

32. A method according to claim 31, wherein the porous surface of the first substrate comprises fibers, and further wherein the transferring further comprises encapsulating at least a portion of at least some of the fibers in the molten nonelastomeric thermoplastic composition.

* * * * *